United States Patent
Ries et al.

(10) Patent No.: US 9,931,891 B1
(45) Date of Patent: Apr. 3, 2018

(54) SUSPENSION SYSTEM FOR A PNEUMATIC COMPACTOR

(71) Applicant: Caterpillar Paving Products Inc., Brooklyn Park, MN (US)

(72) Inventors: Michael W. Ries, Coon Rapids, MN (US); David J. Knopp, Hudson, WI (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 15/263,404

(22) Filed: Sep. 13, 2016

(51) Int. Cl.
*E01C 9/00* (2006.01)
*B60C 9/02* (2006.01)
*E01C 19/27* (2006.01)
*B62D 7/04* (2006.01)

(52) U.S. Cl.
CPC ............... *B60C 9/02* (2013.01); *B62D 7/04* (2013.01); *E01C 19/27* (2013.01)

(58) Field of Classification Search
CPC .............. B60G 9/02; E01C 19/27; B26D 7/04
USPC .................................................. 404/122, 132
See application file for complete search history.

(56) References Cited

U.S. PATENT DOCUMENTS

| 2,287,723 | A | * | 6/1942 | Boyd | E01C 19/27 280/81.1 |
| 3,060,818 | A | * | 10/1962 | Roberts | E01C 19/27 180/20 |
| 4,157,877 | A | | 6/1979 | Lee | |
| 4,193,710 | A | * | 3/1980 | Pietrowski | E01C 19/266 172/518 |
| 5,114,269 | A | * | 5/1992 | Shepherd | E01C 19/236 404/122 |
| 5,494,375 | A | | 2/1996 | Yates | |
| 5,716,162 | A | * | 2/1998 | Hodgson | E01C 19/286 404/117 |
| 6,520,717 | B1 | * | 2/2003 | Otto | B60G 5/02 404/122 |
| 6,612,774 | B1 | * | 9/2003 | Dulin | E01C 19/266 404/104 |
| 7,540,689 | B1 | * | 6/2009 | Major, Sr. | E01C 19/266 172/611 |

FOREIGN PATENT DOCUMENTS

| CN | 1730824 | 2/2006 |
| CN | 204623561 | 9/2015 |

* cited by examiner

Primary Examiner — Raymond W Addie

(57) ABSTRACT

A suspension system for a pneumatic compactor includes a bolster frame and a steering input member coupled to the bolster frame. The suspension system includes at least one support member coupled to the bolster frame. The suspension system includes a support arm coupled to the at least one support member. The suspension system further includes a vibration absorber having a first end coupled to the bolster frame and a second end coupled to the support arm.

17 Claims, 4 Drawing Sheets

SUSPENSION SYSTEM FOR A PNEUMATIC COMPACTOR

TECHNICAL FIELD

The present disclosure relates to a suspension system. More particularly, the present disclosure relates to a suspension system for a pneumatic compactor.

BACKGROUND

Compactor machines, also called as compactors and compaction machines, are frequently employed for compacting dirt, gravel, asphalt, and other compactable surfaces associated with roadbeds and other land areas. One such type of compaction machine is a pneumatic wheel roller-style of compactor, which is dependent upon tire pressure for achieving effective compaction. For successful operation of the pneumatic compactor, the ground contact pressures should be managed in accordance with compaction surface type. Typically, an operator estimates a contact pressure based upon weight of the machine, air pressure of the tires, and compaction conditions in accordance with a chart provided by the machine manufacturer. Overall weight of the machine may be controlled by adding ballast such as sand and/or water, according to a specific ground compaction task.

Suspension and steering systems for pneumatic compactors have been of generally two types. A first type of suspension system includes a central shaft (or a king pin) providing a pivot point for a front bolster. The pneumatic compactor may include 3 or 5 wheels which oscillate on pin joints. This arrangement is very cost effective. However, a large area is required for steering and the suspension system is not very efficient.

Another type of suspension system includes suspension cylinders directly mounted to a frame structure. Multiple cylinders are mounted and tied together to a single steering cylinder. Individual wheels may be pinned to the cylinders providing oscillation. This arrangement is very efficient and requires relatively less area for steering. However, this arrangement is very expensive.

Further, rear wheels on a pneumatic compactor are typically fixed or provide only oscillation. Therefore, an improved suspension system for pneumatic compactors is required which may be effective as well as cost efficient.

SUMMARY

In an aspect of the present disclosure, a suspension system for a pneumatic compactor is provided. The suspension system includes a bolster frame. The suspension system includes a steering input member coupled to the bolster frame. The suspension system includes at least one support member coupled to the bolster frame. The suspension system includes a support arm coupled to at least one support member. The suspension system further includes a vibration absorber having a first end coupled to the bolster frame and a second end coupled to the support arm.

In another aspect of the present disclosure, a suspension system for a pneumatic compactor is provided. The suspension system includes a chain case having a first end and a second end. The first end of the chain case is coupled to a frame of the pneumatic compactor. The suspension system further includes a vibration absorber having a first end and a second end. The first end of the vibration absorber is coupled to the frame of the pneumatic compactor and the second end of the vibration absorber is coupled to the second end of the chain case.

In yet another aspect of the present disclosure, a pneumatic compactor is provided. The pneumatic compactor includes a power source. The pneumatic compactor includes a frame having a front end and a rear end. The pneumatic compactor includes a first suspension system coupled to the frame towards the front end. The first suspension system includes a bolster frame. The first suspension system includes a steering input member coupled to the bolster frame. The first suspension system includes at least one support member coupled to the bolster frame. The first suspension system includes a support arm coupled to at least one support member. The first suspension system further includes a first vibration absorber having a first end coupled to the bolster frame and a second end coupled to the support arm. The pneumatic compactor further includes a second suspension system coupled to the frame towards the rear end. The second suspension system includes a chain case having a first end and a second end. The first end of the chain case is coupled to the frame. The second suspension system further includes a second vibration absorber having a first end and a second end. The first end of the second vibration absorber is coupled to the frame and the second end of the second vibration absorber is coupled to the second end of the chain case.

DETAILED DESCRIPTION

Figure 1:
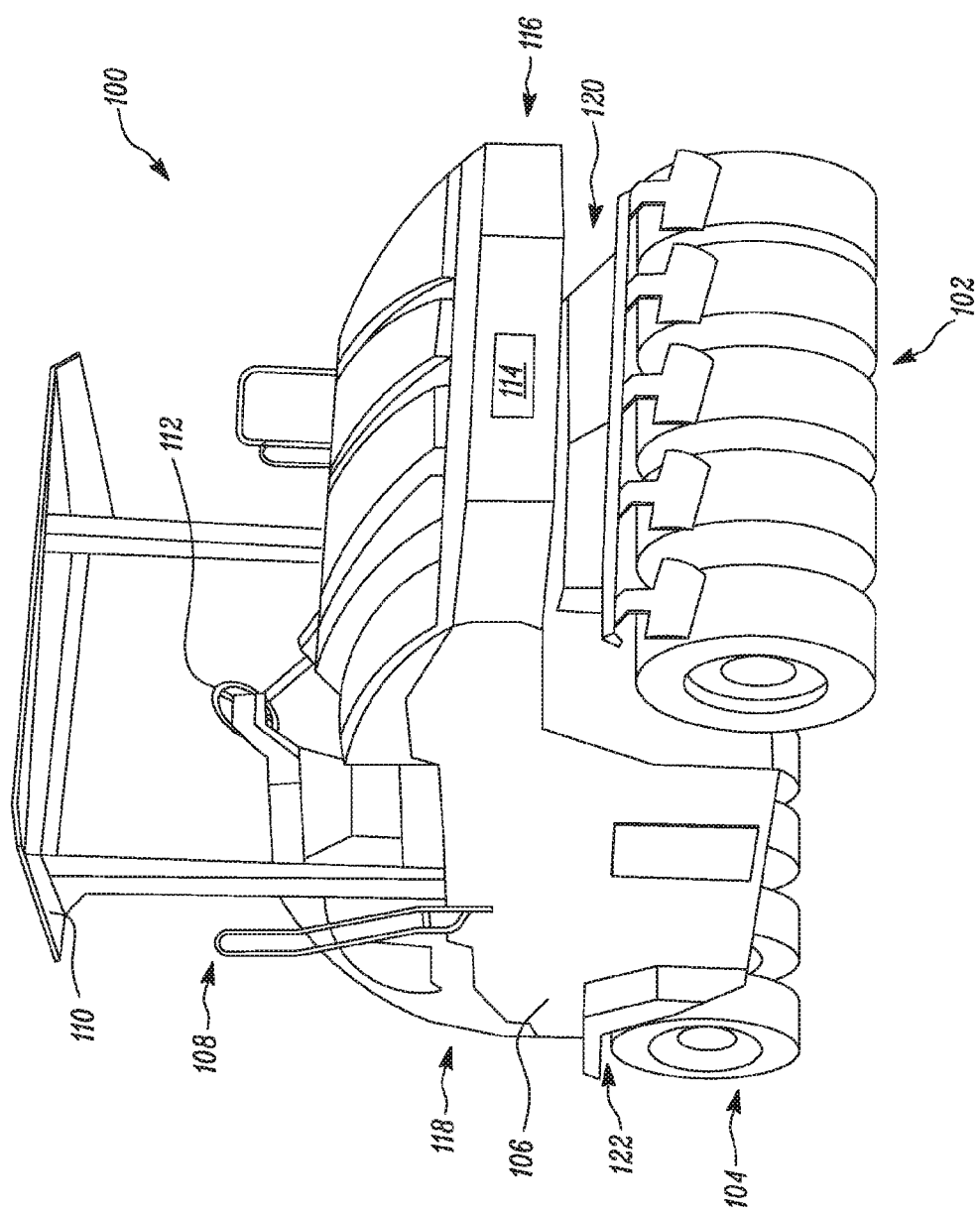
FIG. 1 shows a perspective view of a pneumatic compactor, in accordance with an embodiment of the present disclosure.

Wherever possible, the same reference numbers will be used throughout the drawings to refer to same or like parts. FIG. 1 represents an exemplary machine, according to one embodiment of the present disclosure. The machine is illustrated as a pneumatic compactor 100. The pneumatic compactor 100 may be useful for compacting and/or increasing density of a compaction surface, such as dirt, gravel, and/or bituminous mixtures. The pneumatic compactor 100 has sets of compacting wheels containing pneumatically inflated front tires 102 and rear tires 104. The front tires 102 and the rear tires 104 are rotatably mounted on a frame 106 of the pneumatic compactor 100.

It will be appreciated by those skilled in the art that actual performance of the pneumatic compactor 100 may vary as a function of tire inflation pressure and softness or hardness of the surface being compacted. Thus, low tire inflation pressures will generally improve traction and durability of the pneumatic compactor 100 on softer ground. On the other hand, higher tire inflation pressures may be known to provide more efficient results on firmer surfaces. It should be noted that to the extent that the compaction surface may be softer and of lower density in early stages of the compaction process, the compaction surface may become increasingly denser. Accordingly, this may make the compaction surface relatively more firm after several passes of the pneumatic compactor 100 over the compaction surface.

The pneumatic compactor 100 includes an operator platform 108 having a canopy 110. An operator may sit or stand over the operator platform 108 to maneuver the pneumatic compactor 100. The operator platform 108 includes a steering wheel 112 which is used by the operator to steer the pneumatic compactor 100. The pneumatic compactor 100 further includes a power source 114 to provide power for various subsystems of the pneumatic compactor 100. The power source 114 may be an internal combustion engine, a fuel cell or any other power source capable of providing power to the various subsystems of the pneumatic compactor 100.

Figure 2:
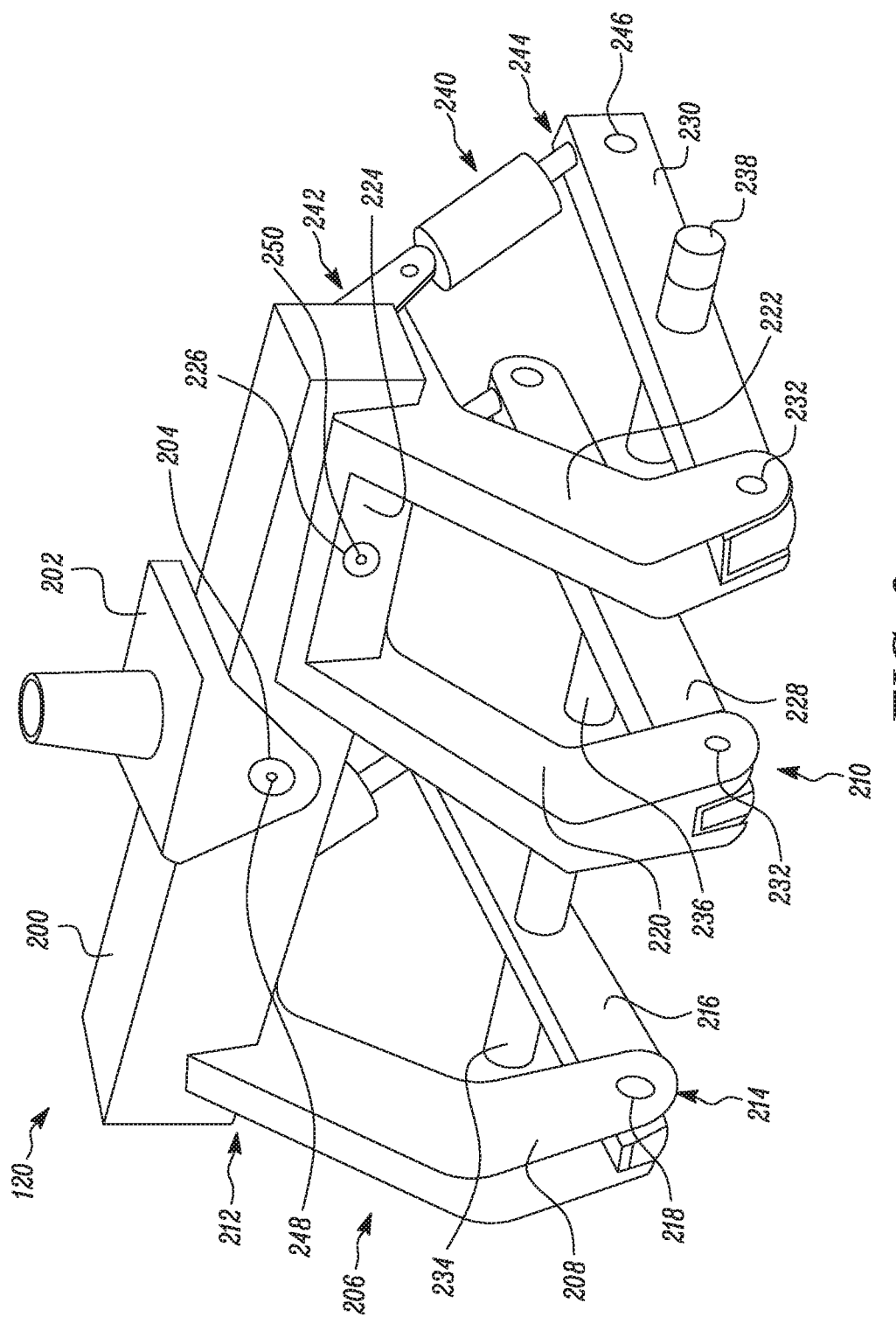
FIG. 2 shows a perspective view of a suspension system for the pneumatic compactor of FIG. 1, in accordance with an embodiment of the present disclosure.
Figure 3:
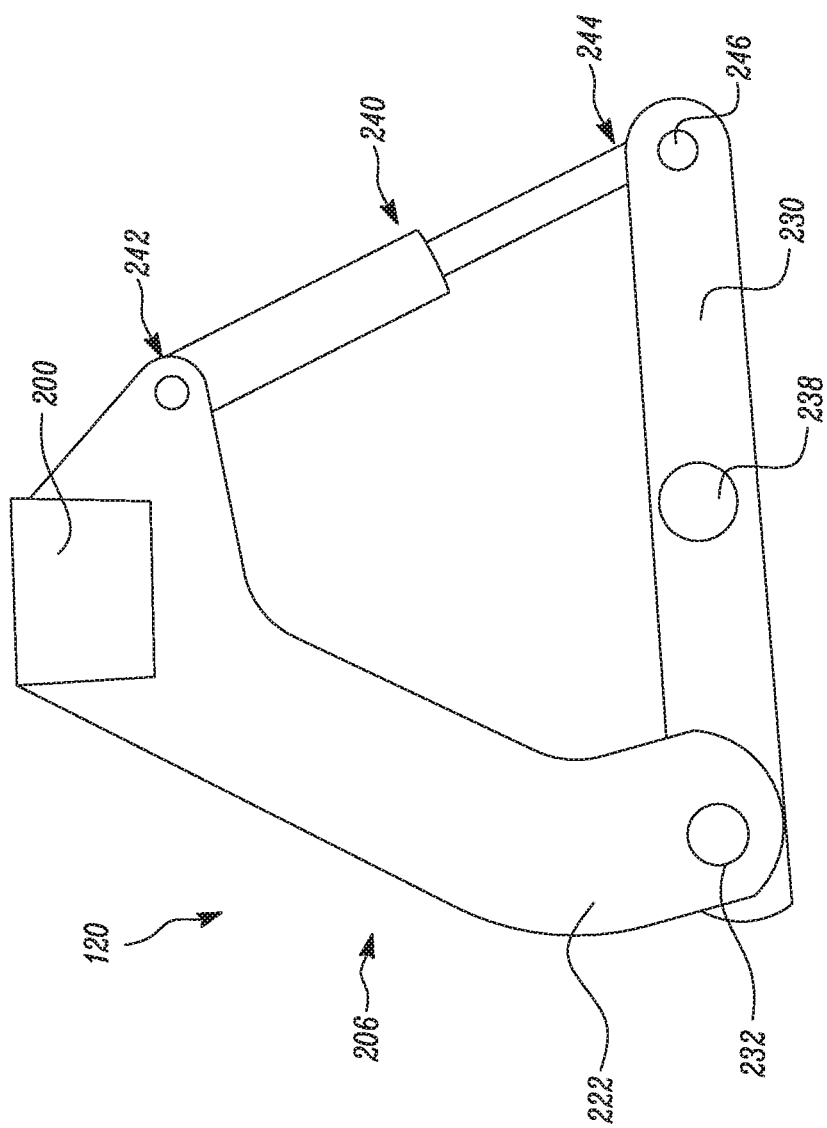
FIG. 3 shows a side view of the suspension system of FIG. 2, in accordance with an embodiment of the present disclosure.

The frame 106 has a front end 116 and a rear end 118. A first suspension system 120 is coupled towards the front end 116 of the frame 106 and a second suspension system 122 is coupled towards the rear end 118 of the frame 106. Details of the first and second suspension systems 120, 122 are described with reference to FIGS. 2-4. With combined reference to FIGS. 2 and 3, the first suspension system 120 includes a bolster frame 200. A steering input member 202 is attached to the bolster frame 200 to provide steering input to the pneumatic compactor 100. The steering input member 202 may be attached to the bolster frame 200 by a first pin joint 204. The steering input member 202 may also be attached to the bolster frame 200 through any other type of joining mechanism as well which may suit the need of the present disclosure. The first suspension system 120 further includes at least one support member 206.

The support member 206 includes a first support member 208 and a second support member 210. The first and second support members 208, 210 may be structurally similar or different as per the need of the current application. In the illustrated embodiment, the first and second support members 208, 210 are having different structural constructions. The first support member 208 is a single longitudinal beam type member having a first end 212 and a second end 214. The first support member 208 is partially bent towards the second end 214. The first end 212 of the first support member 208 is coupled to the bolster frame 200. The first end 212 of the first support member 208 may be connected to the bolster frame 200 through any suitable means of connection such as a pivot joint, a pin joint, or any other type of joining mechanism as well. The second end 214 of the first support member 208 is coupled to a first support arm 216.

The second end 214 of the first support member 208 is coupled to the first support arm 216 by a first pivot joint 218. The second end 214 of the first support member 208 may be coupled to the first support arm 216 through any other suitable means of connection such as a pin joint, or any other type of joining mechanism as well. The first support member 208 may rotate about the first end 212 and the second end 214 as per the constraints of the joining mechanisms on the first and second ends 212, 214. The second support member 210 has a first arm 220 and a second arm 222. The first and second arms 220, 222 are connected to each other by a connecting portion 224. The first arm 220 and the second arm 222 are structurally similar in construction to each other. Further, the first arm 220 and the second arm 222 are also structurally similar in construction to the first support member 208. The second support member 210 is coupled to the bolster frame 200 through the connecting portion 224.

The connecting portion 224 may be coupled to the bolster frame 200 through any suitable means of connection such as a pivot joint, a pin joint, or any other type of joining mechanism as well. In the illustrated embodiment, the connecting portion 224 is coupled to the bolster frame 200 through a second pin joint 226. The second support member 210 is further coupled to a second support arm 228 and a third support arm 230. The first arm 220 of the second support member 210 is coupled to the second support arm 228 and the second arm 222 of the second support member 210 is coupled to the third support arm 230. The first and second arms 220, 222 of the second support member 210 are coupled to the second and third support arms 228, 230 respectively via second pivot joints 232. The first and second arms 220, 222 of the second support member 210 may be coupled to the second and third support arms 228, 230 through any other suitable means of connection as well.

The first, second and third support arms 216, 228, 230 are structurally similar to each other. The first, second and third support arms 216, 228, 230 are generally straight members having means to be coupled through other components of the first suspension system 120 at ends. A first drive axle 234 is coupled to the first support arm 216 to support the front tires 102 of the pneumatic compactor 100. The first support arm 216 may include a hole so as to accommodate the first drive axle 234. In one embodiment, the first drive axle 234 may be an integral part of the first support arm 216. The first drive axle 234 passes through the first support arm 216 and supports two front tires 102 of the pneumatic compactor 100 on either side of the first support arm 216. Similarly, the second support arm 228 includes a second drive axle 236 supporting one front tire 102 of the pneumatic compactor 100 and the third support arm 230 includes a third drive axle 238 supporting two front tires 102 of the pneumatic compactor 100. The arrangement of the first, second and third drive axles 234, 236, 238 with the first, second, and third support arms 216, 228, 230 is purely exemplary. Any combination of the drive axles with the support arms may be provided to suit the need of the current application. The first suspension system 120 further includes a first vibration absorber 240.

Although, the first vibration absorber 240 is illustrated as a cylinder-piston assembly, the first vibration absorber 240 may be any other type of vibration absorbing mechanism as well in accordance with the need of the present disclosure. The first vibration absorber 240 may be actuated by hydraulic means or pneumatic means. The first vibration absorber 240 has a first end 242 and a second end 244. The first and second ends 242, 244 of the first vibration absorber 240 may interchangeably be a piston end and a rod end of the cylinder-piston assembly. The first end 242 of the first vibration absorber 240 is coupled to the bolster frame 200.

The first end 242 of the first vibration absorber 240 may be coupled to the bolster frame 200 through a pivot joint, a pin joint or any other suitable means of connection which may suit the need of the present disclosure. The second end 244 of the first vibration absorber 240 is coupled to the third support arm 230 through a third pivot joint 246. The second end 244 of the first vibration absorber 240 may be coupled to the third support arm 230 through any other suitable means of connection as well as per the need of the present disclosure.

The first vibration absorber 240 absorbs shocks and vibrations which may arise from external factors such as conditions of a ground surface on which the pneumatic compactor 100 is travelling, any obstacles etc. present on the ground surface or any other similar conditions. The first vibration absorber 240 also safeguards the pneumatic compactor 100 against internal shocks and vibrations which may arise due to operation of the various components and subsystems of the pneumatic compactor 100. The first suspension system 120 further includes additional cylinder-piston assemblies (partially shown) acting as vibration absorbers coupled to the bolster frame 200 at one end and the first and second support arms 216, 228 at the other ends respectively. It should be understood that the additional cylinder-piston assemblies are similar to the first vibration absorber 240 in construction and functionality.

The first suspension system 120 further defines a first oscillation point 248 and a second oscillation point 250. The first oscillation point 248 is defined as a point where the steering input member 202 is coupled to the bolster frame 200 by the first pin joint 204. The steering input member 202 provides a steering input for the pneumatic compactor 100. The steering input member 202 may be connected to the steering wheel 112 through mechanical linkages or any other suitable means such that the operator can provide steering instructions through the steering wheel 112 to the steering input member 202. The first suspension system 120 oscillates about the first oscillation point 248 according to the steering input provided by the steering input member 202. As the steering input member 202 is coupled with the bolster frame 200, the bolster frame 200 also oscillates about the first oscillation point 248. The first support member 208, being connected to the bolster frame 200, in turn, guides the front tires 102 of the pneumatic compactor 100 coupled to the first drive axle 234 of the first support arm 216.

The second oscillation point 250 is defined as a point where the connecting portion 224 of the second support member 210 is coupled with the bolster frame 200 by the second pin joint 226. As the steering input member 202 provides steering input to the bolster frame 200, the first suspension system 120 oscillates about the first oscillation point 248. Further, the first suspension system 120 oscillates about the second oscillation point 250. Thereafter, the second support member 210 guides the front tires 102 of the pneumatic compactor 100 attached to the second and third drive axles 236, 238 of the second and third support arms 228, 230 respectively to steer the pneumatic compactor 100 accordingly.

Figure 4:
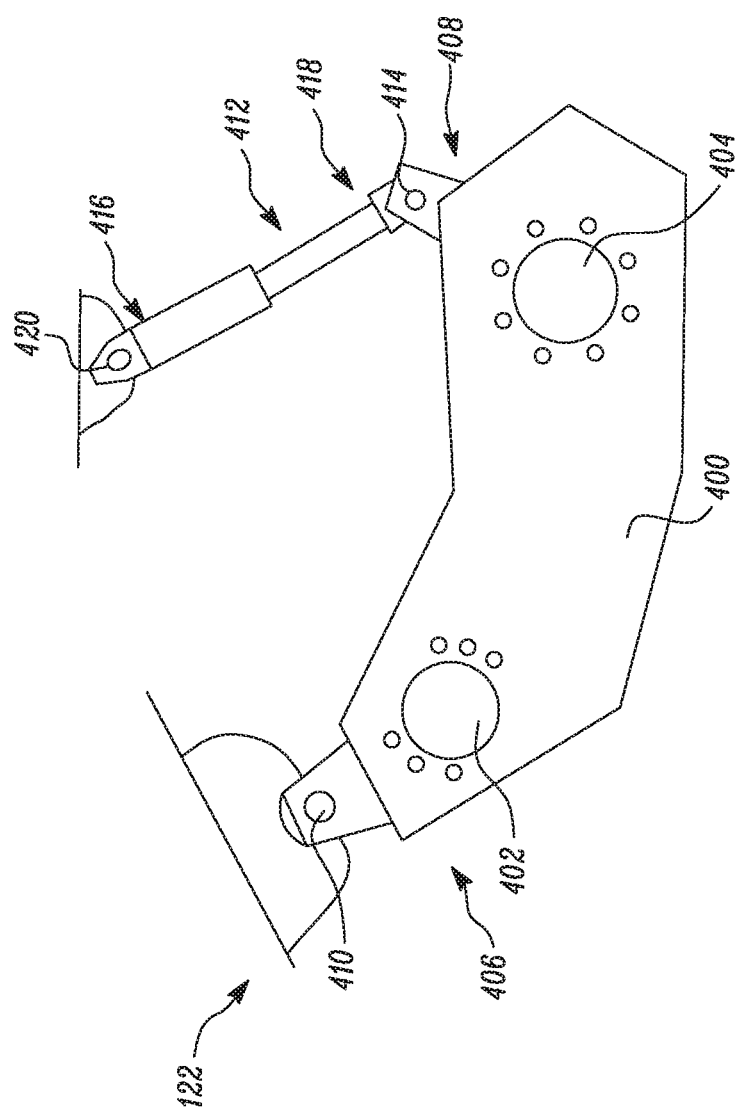
FIG. 4 shows a side view of a suspension system for the pneumatic compactor of FIG. 1, in accordance with another embodiment of the present disclosure.

FIG. 4 illustrates the second suspension system 122 of the pneumatic compactor 100. The second suspension system 122 includes a chain case 400. The chain case 400 includes a motor mounting slot 402 and a drive axle mounting slot 404 to mount a motor (not shown) and a rear drive axle (not shown) respectively. The motor provides motive power for the rear tires 104 of the pneumatic compactor 100. The rear drive axle supports the rear tires 104 of the pneumatic compactor 100. The chain case 400 houses a chain assembly (not shown) which transfers the motive power to the rear tires 104 from the motor through the rear drive axle. The chain case 400 has a first end 406 and a second end 408.

The first end 406 of the chain case 400 is coupled with the frame 106 of the pneumatic compactor 100 by a third pin joint 410. Any other joining mechanism may also be used which may suit the need of the present disclosure. The second end 408 of the chain case 400 is attached to a second vibration absorber 412 through a fourth pin joint 414. The second end 408 of the chain case 400 may also be attached to the second vibration absorber 412 through any other suitable joining mechanism in accordance with the scope of the present disclosure. Although, the second vibration absorber 412 is illustrated as a cylinder-piston assembly, the second vibration absorber 412 may be any other type of vibration absorbing mechanism as well which may be suitable for the need of the present disclosure. The second vibration absorber 412 may be actuated by hydraulic means or pneumatic means. The second vibration absorber 412 has a first end 416 and a second end 418. The first and second ends 416, 418 of the second vibration absorber 412 may interchangeably be a piston end and a rod end of the cylinder-piston assembly.

The first end 416 of the second vibration absorber 412 is coupled to the frame 106 of the pneumatic compactor 100 through a fifth pin joint 420. The second end 418 of the second vibration absorber 412 is coupled to the second end 408 of the chain case 400 through the fourth pin joint 414. The second suspension system 122 provides support to the frame 106 of the pneumatic compactor 100 towards the rear end 118 of the frame 106. It should be contemplated that multiple cylinder-piston assemblies are used in combination as the second vibration absorber 412 instead of a single cylinder-piston assembly as illustrated in the side view. The second suspension system 122 absorbs vibrations arising from external as well as the internal factors towards the rear end 118 of the frame 106 of the pneumatic compactor 100.

INDUSTRIAL APPLICABILITY

The present disclosure provides an improved suspension and steering system for the pneumatic compactor 100. The pneumatic compactor 100 includes the frame 106 having the front end 116 and the rear end 118. The first suspension system 120 is coupled towards the front end 116 of the frame 106 and the second suspension system 122 is coupled towards the rear end 118 of the frame 106. The first suspension system 120 includes the bolster frame 200 and the steering input member 202 coupled to the bolster frame 200 at the first oscillation point 248. The first suspension system 120 includes the first support member 208 coupled to the bolster frame 200 at the first end 212 and the first support arm 216 at the second end 214. The first suspension system 120 includes the second support member 210 having the first arm 220 connected to the second arm 222 by the connecting portion 224. The connecting portion 224 is coupled to the bolster frame 200 at the second oscillation point 250. The first arm 220 of the second support member 210 is pivotally coupled with the second support arm 228 and the second arm 222 of the second support member 210 is coupled with the third support arm 230.

The first end 242 of the first vibration absorber 240 is coupled to the bolster frame 200 and the second end 244 of the first vibration absorber 240 is pivotally coupled to the third support arm 230. The second suspension system 122 includes the chain case 400 housing the chain assembly and mounts the motor and the rear drive axle through the motor mounting slot 402 and the drive axle mounting slot 404 respectively. The first end 406 of the chain case 400 is coupled with the frame 106 and the second end 408 of the chain case 400 is coupled with the second end 418 of the second vibration absorber 412. The second vibration absorber 412 is also attached to the frame 106 of the pneumatic compactor 100 at the first end 416 of the second vibration absorber 412.

The first suspension system 120 provides an efficient steering arrangement for the pneumatic compactor 100. As the first suspension system 120 can oscillate about the first oscillation point 248 and further oscillate about the second oscillation point 250, the pneumatic compactor 100 can be steered more efficiently and quickly taking lesser area for steering. The first and second suspension systems 120, 122 use cylinder-piston assemblies as vibration absorbers providing efficient dampening of shocks and vibrations arising due to external factors such as the ground surface conditions as well as internal factors due to the operation of the pneumatic compactor 100. This improves efficiency of the pneumatic compactor 100 and enhances productivity of the pneumatic compactor 100 by improving quality of the ground surface being prepared by the pneumatic compactor 100.

The first and second suspension systems 120, 122 are designed in a very simple manner making the maintenance and service procedures very easy. All the components of the first and second suspension systems 120, 122 can be easily accessed and taken care of accordingly. Further, a simple design also provides an added advantage of quick diagnostics in case of a fault etc. Overall, the present disclosure provides with an efficient and cost effective suspension system for the pneumatic compactor 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A suspension system for a pneumatic compactor, the suspension system comprising:
   a bolster frame;
   a steering input member coupled to the bolster frame;
   at least one support member coupled to the bolster frame and including a first support member and a second support member, the second support member having a first arm and a second arm, the first arm connected to the second arm via a connecting portion, wherein the second support member is connected to the bolster frame via the connecting portion at a second oscillation point;
   a support arm coupled to the at least one support member; and
   a vibration absorber having a first end coupled to the bolster frame and a second end coupled to the support arm.

2. The suspension system of claim 1, wherein the steering input member is coupled to the bolster frame at a first oscillation point.

3. The suspension system of claim 1, wherein the second end of the vibration absorber is coupled to the support arm through a pivot joint.

4. The suspension system of claim 1, wherein the first support member has a first end coupled to the bolster frame and a second end coupled to the support arm.

5. The suspension system of claim 1, wherein the vibration absorber is a cylinder-piston assembly.

6. The suspension system of claim 5, wherein the vibration absorber is actuated by at least one of a hydraulic means or a pneumatic means.

7. The suspension system of claim 1, wherein the support arm is coupled to the at least one support member by a pivot joint.

8. A suspension system for a pneumatic compactor, the suspension system comprising:
   a bolster frame;
   a steering input member coupled to the bolster frame;
   at least one support member coupled to the bolster frame;
   a support arm coupled to the at least one support member, wherein the support arm includes a drive axle coupled to the support arm; and
   a vibration absorber having a first end coupled to the bolster frame and a second end coupled to the support arm.

9. A suspension system for a pneumatic compactor, the suspension system comprising:
   a chain case having a first end and a second end, the first end coupled to a frame of the pneumatic compactor; and
   a vibration absorber having a first end and a second end, the first end coupled to the frame of the pneumatic compactor and the second end coupled to the second end of the chain case.

10. The suspension system of claim 9, wherein the chain case includes means for mounting a motor and a drive axle.

11. The suspension system of claim 9, wherein the first end of the chain case is coupled to the frame of the pneumatic compactor by a pin joint.

12. The suspension system of claim 9, wherein the first end of the vibration absorber is coupled to the frame of the pneumatic compactor by a pin joint.

13. The suspension system of claim 9, wherein the vibration absorber is a cylinder-piston assembly.

14. The suspension system of claim 13, wherein the vibration absorber is actuated by at least one of a hydraulic means or a pneumatic means.

15. The suspension system of claim 9, wherein the chain case encloses a chain assembly, the chain assembly adapted to transfer driving power to rear wheels.

16. A pneumatic compactor comprising:
   a power source;
   a frame having a front end and a rear end;
   a first suspension system coupled to the frame towards the front end, the first suspension system including:
      a bolster frame;
      a steering input member coupled to the bolster frame;
      at least one support member coupled to the bolster frame;
      a support arm coupled to the at least one support member; and
      a first vibration absorber having a first end coupled to the bolster frame and a second end coupled to the support arm; and
   a second suspension system coupled to the frame towards the rear end, the second suspension system including:
      a chain case having a first end and a second end, the first end coupled to the frame;
      a second vibration absorber having a first end and a second end, the first end coupled to the frame and the second end coupled to the second end of the chain case.

17. The pneumatic compactor of claim 16, wherein the first vibration absorber and the second vibration absorber are cylinder-piston assemblies.

* * * * *